(12) United States Patent
Thomson et al.

(10) Patent No.: US 7,956,803 B2
(45) Date of Patent: Jun. 7, 2011

(54) SYSTEM AND METHOD FOR PROTECTING AGAINST SPOOFED A-GNSS MEASUREMENT DATA

(75) Inventors: Martin Thomson, Keiraville (AU); Neil Harper, Mangerton (AU)

(73) Assignee: Andrew, LLC, Hickory, NC (US)

( * ) Notice: Subject to any disclaimer, the term of this patent is extended or adjusted under 35 U.S.C. 154(b) by 32 days.

(21) Appl. No.: 12/325,612

(22) Filed: Dec. 1, 2008

(65) Prior Publication Data

US 2010/0134352 A1  Jun. 3, 2010

(51) Int. Cl.
*G01S 19/21* (2010.01)
*G01S 19/20* (2010.01)

(52) U.S. Cl. .............. 342/357.59; 342/357.58

(58) Field of Classification Search .......... 342/357.02, 342/357.09, 357.1, 357.15, 357.58, 357.59
See application file for complete search history.

(56) References Cited

U.S. PATENT DOCUMENTS

| | | | |
|---|---|---|---|
| 4,728,959 A | 3/1988 | Maloney et al. | |
| 5,327,144 A | 7/1994 | Stilp et al. | |
| 5,608,410 A | 3/1997 | Stilp et al. | |
| 5,754,657 A * | 5/1998 | Schipper et al. | 380/258 |
| 5,959,580 A | 9/1999 | Maloney et al. | |
| 6,047,192 A | 4/2000 | Maloney et al. | |
| 6,091,362 A | 7/2000 | Stilp et al. | |
| 6,097,336 A | 8/2000 | Stilp | |
| 6,101,178 A | 8/2000 | Beal | |
| 6,108,555 A | 8/2000 | Maloney et al. | |
| 6,115,599 A | 9/2000 | Stilp | |
| 6,119,013 A | 9/2000 | Maloney et al. | |
| 6,127,975 A | 10/2000 | Maloney | |
| 6,172,644 B1 | 1/2001 | Stilp | |
| 6,184,829 B1 | 2/2001 | Stilp | |
| 6,266,013 B1 | 7/2001 | Stilp et al. | |
| 6,281,834 B1 | 8/2001 | Stilp | |
| 6,285,321 B1 | 9/2001 | Stilp et al. | |
| 6,288,675 B1 | 9/2001 | Maloney | |
| 6,288,676 B1 | 9/2001 | Maloney | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack et al. | |
| 6,388,618 B1 | 5/2002 | Stilp et al. | |
| 6,400,320 B1 | 6/2002 | Stilp et al. | |
| 6,411,254 B1 | 6/2002 | Moeglein et al. | |
| 6,463,290 B1 | 10/2002 | Stilp et al. | |

(Continued)

FOREIGN PATENT DOCUMENTS

KR  100052313  6/2001

(Continued)

*Primary Examiner* — Thomas H Tarcza
*Assistant Examiner* — Cassi Galt
(74) *Attorney, Agent, or Firm* — Duane Morris, LLP

(57) ABSTRACT

A system and method for detecting one or more forged satellite measurements transmitted from a wireless device. Information may be transmitted to a wireless device, the information including a request that the wireless device provide a portion of a navigation data message from one or more satellites to a location determining system. The one or more satellite measurements and the portion of the navigation data message may be received from the wireless device. The navigation data message may be determined as a function of information from a reference network. The determined navigation data message may then be compared with the received navigation data message portion to thereby determine whether any of the one or more satellite measurements transmitted by the device have been forged.

33 Claims, 7 Drawing Sheets

U.S. PATENT DOCUMENTS

| | | |
|---|---|---|
| 6,483,460 B2 | 11/2002 | Stilp et al. |
| 6,492,944 B1 | 12/2002 | Stilp |
| 6,519,465 B2 | 2/2003 | Stilp et al. |
| 6,546,256 B1 | 4/2003 | Maloney et al. |
| 6,563,460 B2 | 5/2003 | Stilp et al. |
| 6,603,428 B2 | 8/2003 | Stilp |
| 6,646,604 B2 | 11/2003 | Anderson |
| 6,661,379 B2 | 12/2003 | Stilp et al. |
| 6,703,972 B2 | 3/2004 | van Diggelen |
| 6,731,701 B2 | 5/2004 | Vorobiev et al. |
| 6,765,531 B2 | 7/2004 | Anderson |
| 6,771,625 B1 | 8/2004 | Beal |
| 6,782,264 B2 | 8/2004 | Anderson |
| 6,873,290 B2 | 3/2005 | Anderson et al. |
| 6,876,859 B2 | 4/2005 | Anderson et al. |
| 6,934,631 B2 * | 8/2005 | Dentinger et al. ............ 701/213 |
| 6,996,392 B2 | 2/2006 | Anderson et al. |
| 7,023,383 B2 | 4/2006 | Stilp et al. |
| 7,167,713 B2 | 1/2007 | Anderson |
| 7,271,765 B2 | 9/2007 | Stilp et al. |
| 7,340,259 B2 | 3/2008 | Maloney et al. |
| 7,391,677 B2 | 6/2008 | Urano et al. |
| 7,427,952 B2 | 9/2008 | Bull et al. |
| 7,440,762 B2 | 10/2008 | Maloney et al. |
| 7,512,492 B2 * | 3/2009 | Irvin et al. .................... 701/213 |
| 7,548,196 B2 * | 6/2009 | Fagan et al. ............... 342/357.02 |
| 7,589,667 B2 * | 9/2009 | van Diggelen et al. .. 342/357.02 |
| 7,593,738 B2 | 9/2009 | Anderson |
| 2002/0172223 A1 | 11/2002 | Stilp |
| 2003/0064734 A1 | 4/2003 | Stilp et al. |
| 2005/0270232 A1 * | 12/2005 | Masuda .................... 342/357.02 |
| 2006/0003775 A1 | 1/2006 | Bull et al. |
| 2006/0023655 A1 * | 2/2006 | Engel et al. .................... 370/328 |
| 2006/0030333 A1 | 2/2006 | Ward et al. |
| 2007/0111746 A1 | 5/2007 | Anderson |
| 2007/0155401 A1 | 7/2007 | Ward et al. |
| 2007/0155489 A1 | 7/2007 | Beckley et al. |
| 2007/0194984 A1 * | 8/2007 | Waid ........................ 342/357.02 |
| 2008/0106463 A1 | 5/2008 | Diggelen et al. |
| 2008/0132244 A1 | 6/2008 | Anderson |
| 2008/0132247 A1 | 6/2008 | Anderson |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

FOREIGN PATENT DOCUMENTS

| | | |
|---|---|---|
| KR | 100078315 | 8/2001 |
| WO | 2004038447 A1 | 5/2004 |
| WO | 2005083461 A1 | 9/2005 |

* cited by examiner

SYSTEM AND METHOD FOR PROTECTING AGAINST SPOOFED A-GNSS MEASUREMENT DATA

RELATED APPLICATIONS

The instant application is related to U.S. application Ser. No. 12/276,804, entitled, "System and Method for Determining Falsified Satellite Measurements," filed Nov. 24, 2008, U.S. application Ser. No. 12/276,852, entitled, "System and Method for Determining Falsified Geographic Location of a Mobile Device," filed Nov. 24, 2008, and U.S. application Ser. No. 12/276,917, entitled, "System and Method for Server Side Detection of Falsified Satellite Measurements," filed Nov. 24, 2008, the entirety of each incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The LC2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Downloading broadcasted ephemeris information from one or more of the satellites is slow (i.e., no faster than 18 seconds given that a respective GPS satellite-navigation message is 900 bits in length and broadcast in a 50 bps data stream). When in environments in which GPS signals possess low signal strengths, downloading ephemeris information is frequently difficult and sometimes impossible. Responsive to these obstacles, some prior and current GPS implementations make use of a terrestrial wireless or wired communication medium for transmitting ephemeris information to a GPS. These GPS implementations are commonly known as "Assisted-GPS" or, simply, A-GPS and/or A-GNSS.

A-GPS has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

Civilian GPS signals are vulnerable to attacks such as blocking, jamming and spoofing. The goal of such attacks generally is to prevent a position lock (e.g., blocking and jamming) or to feed a receiver false information so that the receiver computes an erroneous time or location (e.g., spoofing). GPS receivers are generally aware when blocking or jamming is occurring because the receivers encounter a loss of signal. Spoofing, however, is a surreptitious attack. Currently, no countermeasures are in use for detecting spoofing attacks.

Civilian GPS signals are widely used by government and private industries for important applications, including, but not limited to, public safety services, navigation, geolocation, hiking, surveying, robotics, tracking, etc. Unfortunately, civilian GPS signals are not secure. Since GPS signal strength, measured at the Earth's surface at about −160 dBw ($1 \times 10^{-16}$ watts), is roughly equivalent to viewing a 25 watt light bulb from a distance of 10,000 miles, GPS signals may be blocked by destroying or shielding a receiver's antenna and may be jammed by a signal of a similar frequency but greater strength. As stated above, however, blocking and jamming are not the greatest security risk. A more pernicious attack involves feeding the receiver fake or forged satellite signals so that the receiver believes it is located somewhere in space and time that it is not. Spoofing may be accomplished by utilizing a GPS satellite simulator. Such simulators are uncontrolled and widely available. To conduct the spoofing attack, an adversary may broadcast a forged satellite signal with a higher signal strength than the true signal, and the GPS receiver believes that the forged signal is actually a true GPS signal. The receiver may then proceed to calculate erroneous position or time information based on this forged signal.

It is also possible for an unscrupulous user or intermediary to alter the software in a wireless device to manipulate satellite measurements thereby causing a location determining system to calculate an incorrect location. This method of spoofing is generally termed as location spoofing. Generally, if satellite measurements are manipulated in a wireless device randomly, it is likely that a resulting position calculation will fail because the position of the respective satellites will be too far away from the actual code phase indicated location; however, a skillful user may calculate code phases that are required to result in the calculation of a spoofed or false location by the location determining system.

When acquiring GNSS measurements for A-GNSS positioning, conventional devices do not utilize information available in the navigation data message provided by satellite signals. The navigation data message, however, contains elements that are dynamic and thus difficult to predict and spoof. Unfortunately, the navigation data message is modulated on the coarse acquisition signal at a rate of 50 bps. GPS uses 1500 bits in each frame, and thus it takes 30 seconds to receive an entire frame, much longer than the typical time allowed for A-GNSS positioning.

Accordingly, there is a need for a method and system for protecting against spoofed A-GNSS measurements that would overcome the deficiencies of the prior art. Therefore, an embodiment of the present subject matter provides a method for detecting one or more forged satellite measurements transmitted from a wireless device. The method may comprise sending information to a wireless device, the information including a request that the wireless device provide a portion of a navigation data message from one or more satellites to a location determining system. One or more satellite measurements and the portion of the navigation data message may be received from the wireless device. The navigation data message may be determined from the one or more satellites as a function of information from a reference network. The determined navigation data message may then be compared with the received navigation data message to thereby determine whether any of the one or more satellite measurements transmitted by the device have been forged.

Another embodiment of the present subject matter provides a method for determining whether a wireless device transmitted a forged satellite measurement. The method may comprise receiving at the wireless device signals from a plurality of satellites and transmitting to a location determining system signals representing measurements from the plurality of satellites, the measurements including one or more portions of a navigation data message. A navigation data message may be determined from the plurality of satellites as a function of information from a reference network, and then the determined navigation data message compared with the received navigation data message portions from the device to thereby determine whether one or more of the received satellite measurements have been forged.

A further embodiment of the present subject matter may provide a method for determining the estimated location of a wireless device when the device transmits one or more forged satellite measurements to a location determining system. The method may include sending a request to a wireless device to provide a portion of a navigation data message from one or more satellites to a location determining system. The one or more satellite measurements and the portion of the navigation data message from the wireless device may be received by a location determining system. The received navigation data message may then be compared to an assembled navigation data message to thereby determine whether any of the one or more satellite measurements have been forged. An estimated location of the wireless device may then be determined without the one or more forged satellite measurements.

One embodiment of the present subject matter provides a system for detecting one or more forged satellite measurements transmitted from a wireless device. The system may include a transmitter for sending information to a wireless device, the information including a request that the wireless device provide a portion of a navigation data message from one or more satellites. The system may further include a receiver for receiving one or more satellite measurements and the portion of the navigation data message from the wireless device, and circuitry for determining the navigation data message from the one or more satellites as a function of information from a reference network. The system may also include circuitry for comparing the determined navigation data message with the received navigation data message to thereby determine whether any of the one or more satellite measurements have been forged.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIG. 3 is an illustration of the structure of a GPS hand over word.

DETAILED DESCRIPTION

Figure 1:
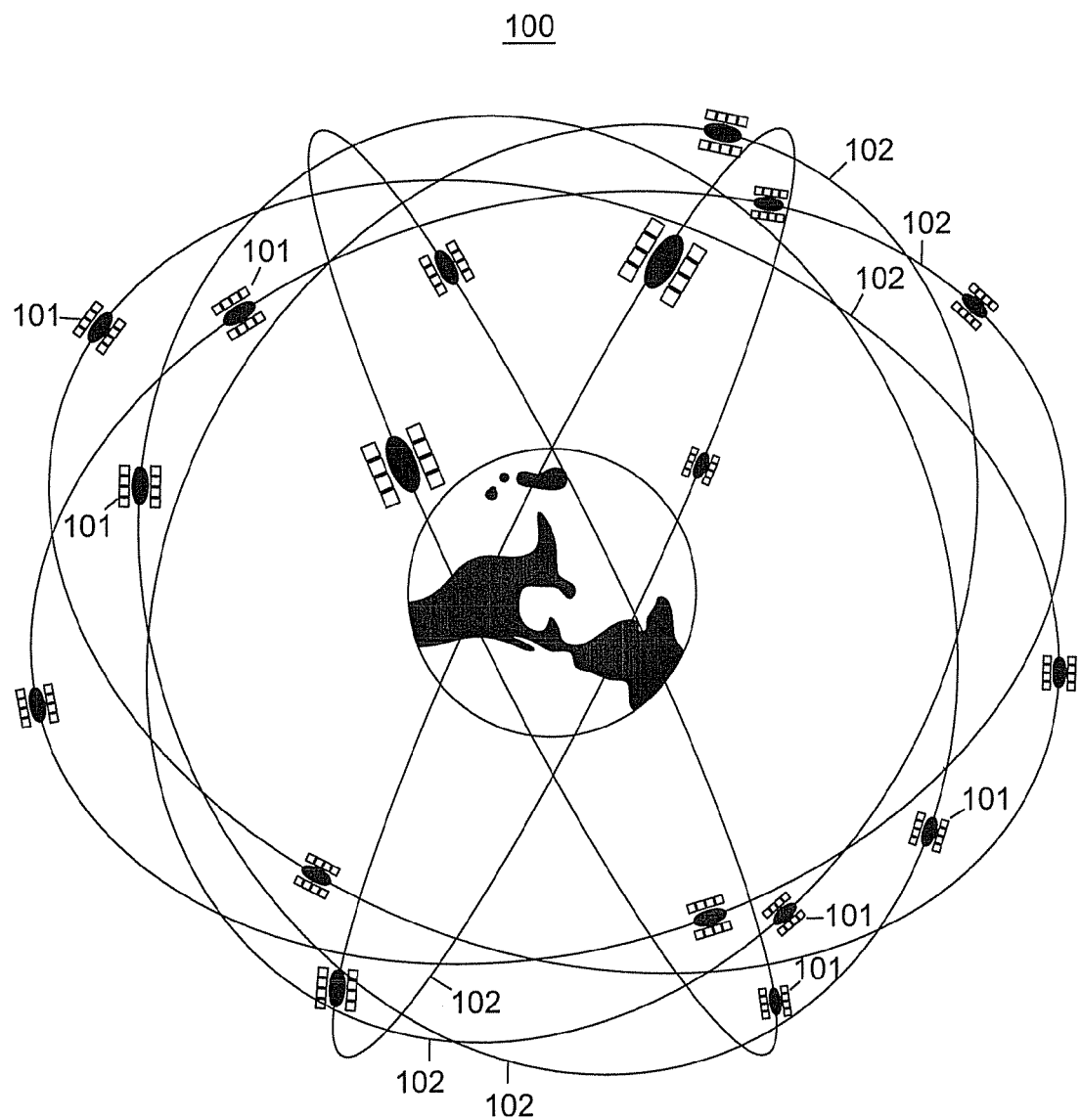
FIG. 1 is a schematic representation of a constellation of GPS satellites.

With reference to the figures where like elements have been given like numerical designations to facilitate an understanding of the present subject matter, the various embodiments of a system and method for protecting against spoofed A-GNSS measurement data are herein described.

The disclosure relates to a mobile appliance or device and a location determining system using satellite signals and/or measurements of these satellite signals. Exemplary devices may include, but are not limited to, a cellular device, text messaging device, computer, portable computer, vehicle locating device, vehicle security device, communication device, and wireless transceiver. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above. Further, the terms spoofed, falsified, forged, and various tenses and forms thereof are utilized interchangeably throughout this disclosure and such use should in no way should be interpreted as limiting the scope of the claims appended herewith.

Generally wireless A-GPS devices or handsets have a low time to first fix ("TTFF") as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS"), or other comparable network element. The location determining system may generally be a node in a wireless network that performs the location of a mobile device. The location determining system generally requires a wireless device to provide true and accurate measurements (rather than forged measurements) to determine an accurate location or provide accurate assistance data. The integrity of the resulting location is important because the location may be used by emergency services operators to find an injured person, for location-based services, etc.

When acquiring GNSS measurements for A-GNSS positioning, conventional devices do not utilize information available in the navigation data message provided by satellite signals. For example, the GPS navigation data message is modulated on the coarse acquisition signal at a rate of 50 bps. GPS uses 1500 bits in each frame, and thus it takes 30 seconds to receive the entire frame, much longer than the typical time allowed for A-GNSS positioning. The navigation data message, however, contains elements that are dynamic and thus difficult to predict and spoof.

Figure 2:
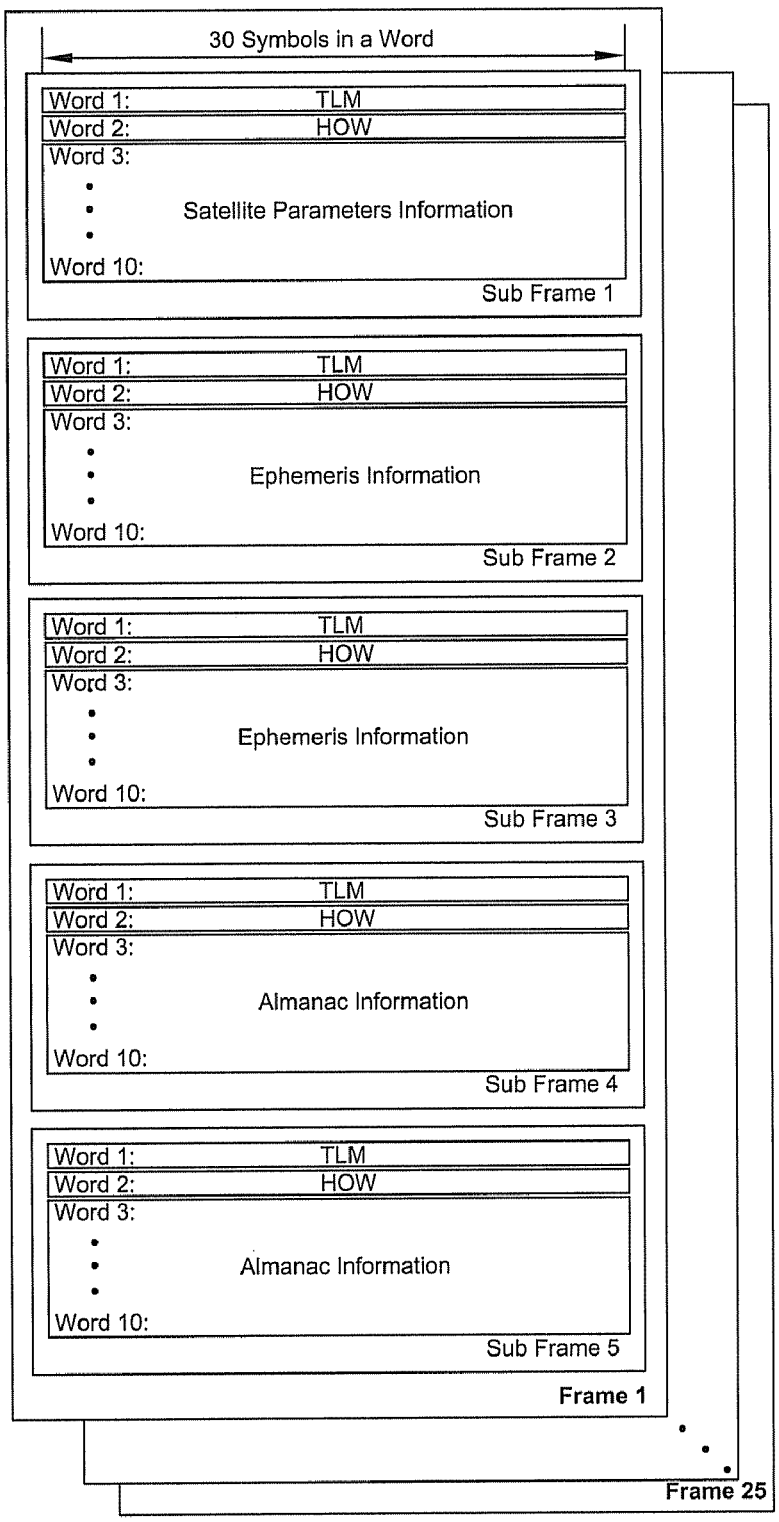
FIG. 2 is an illustration of the structure of a GPS navigation data message.

FIG. 2 is an illustration of the structure of a GPS navigation data message. With reference to FIG. 2, one complete navigation data message of a GPS satellite consists of 25 frames and has a duration of 750 seconds (12.5 minutes). One frame is transmitted for 30 seconds and includes 5 sub-frames. Each sub-frame has 10 words, and each word contains 30 binary symbols (bits), among those there are six parity bits. A symbol has duration of 20 ms; therefore, a complete navigation data message includes 37,500 symbols.

Each sub-frame comprises a telemetry ("TLM") word and a hand-over word ("HOW") which are transmitted first. The first seventeen bits of the HOW contain a value representative of the time of the week ("TOW"), as measured from midnight Saturday, UTC time for GPS. The next eight words, referred to as words 3-10, provide the clock, ephemeris, and almanac data. Specifically, the first sub-frame includes satellite clock parameters and other satellite information. The second and third sub-frames include ephemeris data, and the fourth and fifth sub-frames include almanac data. Ephemeris data is changed once every 1 to 6 hours, and is usually changed once every two hours. Data within the first, second, and third sub-frames repeats in every frame (and thus repeats every 30 seconds). A complete Almanac is distributed among the 25 frames in sub-frames 4 and 5 thereof, and one must read through all 25 frames to obtain a complete Almanac. Accordingly, a complete Almanac repeats once every 750 seconds.

Figure 3:
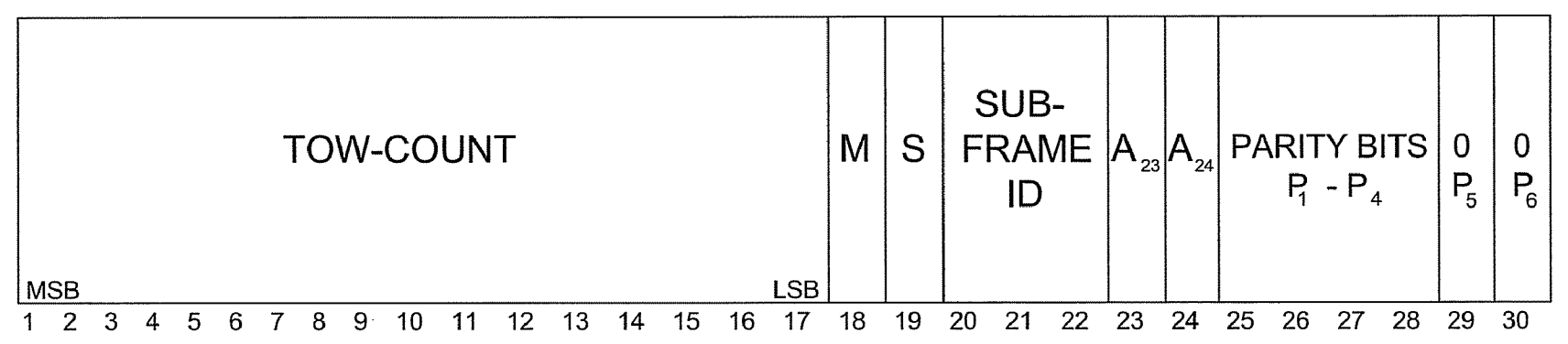

The major portion of information in the navigation data message is repetitive: ephemeris data repeats every 30 seconds, and almanac data repeats every 750 seconds. The TLM word from each satellite is also repetitive and may be determined by a priori knowledge. The TOW value transmitted in each HOW does not repeat. For example, the TOW value increases by one unit every sub-frame, starting from the beginning of the week. FIG. 3 is an illustration of the structure of a GPS HOW. The first seventeen bits hold the TOW count, which is incremented in value by one each sub-frame. The next two bits M and S, which are the eighteenth and nineteenth bits, hold flags which represent the current state of the momentum flag and the synchronization flag, respectively. The next three bits (20-22) contain an integer identifier for the sub-frame. The bits have the following values for sub-frames 1-5, respectively: (0, 0, 1), (0, 1, 0), (0, 1, 1), (1, 0, 0), and (1, 0, 1). The next two bits (23-24) are the last two bits of the previous word. The last six bits of the HOW are parity bits.

Generally, an aim with spoofing GNSS measurements is to convince a location determining system to provide a location for an attacker based on the location the attacker selects. By spoofing the measurement data, the attacker may falsify location information indirectly, potentially avoiding other protections and thereby gaining some form of certification. If the location determining system is trusted more highly by the recipients of the location information, this attack may be utilized to elevate the privileges of the attacker based on an increased trust in the location information provided. For example, by indirectly falsifying location information, an attacker may gain access to a television broadcast that was limited to a particular set of geographically located users if the recipient of the falsified location trusted the location determining system to provide an accurate location.

To spoof GNSS measurements, an attacker may request acquisition assistance data for a desired location including a predicted value for components of each respective GNSS measurement. A location determining system has few options in validating that the values provided by the attacker are legitimate. Most prior art techniques for checking veracity rely upon matching the result produced from a GNSS calculation to a location derived by other means, which is costly and ineffectual.

Embodiments of the present subject matter, however, increase the complexity required to spoof GNSS measurements by requesting that a mobile device provide proof that the device has actually measured the GNSS signal. This may be achieved by requiring the mobile device to provide the most recent bits of a navigation data message it received before taking a respective GNSS measurement. Of course, any portion or multiple portions of the navigation data message discussed above may be requested by the location determining system, and the previous example should in no way limit the scope of the claims appended herewith. For example, given that a satellite signal lock may not be acquired at the same instant for all satellites, more bits may be requested and/or provided for satellites that are acquired sooner. While the major portion of information in the navigation data message is repetitive, requesting a mobile device to provide the most recent bits thereof prior to taking a GNSS measurement would prove difficult for an attacker or spoofer to emulate or predict.

In addition to the navigation data message, the time of measurement may also be requested of the mobile device and/or provided as an offset from the last change in the navigation data message bit sequence. These exemplary embodiments would assist a respective location determining system by determining an actual time that respective satellite measurements were made. Generally, existing measurements provide information within a millisecond window without an indication of which millisecond; however, resolution of this time may be conducted through known methods.

A location determining system according to embodiments of the present subject matter may observe, reconstruct, assemble and/or predict a navigation data message. For example, a reference network of GNSS receivers may be available to an exemplary system that provides the necessary information. The reference network may include a plurality of geographically dispersed reference stations. These stations may be fixed reference stations and/or mobile reference stations. An exemplary reference network may be, but is not limited to, a wide area reference network ("WARN"). Exemplary information may be, but is not limited to, ephemeris information, almanac information, ionosphere model information, UTC model information, and combinations thereof. Upon receipt of the appropriate measurement data, the location determining system calculates a navigation data message. From this calculation and any known information about the navigation data message, the location determining system may determine whether the navigation data message bits provided by a mobile device match the expected values.

Figure 4:
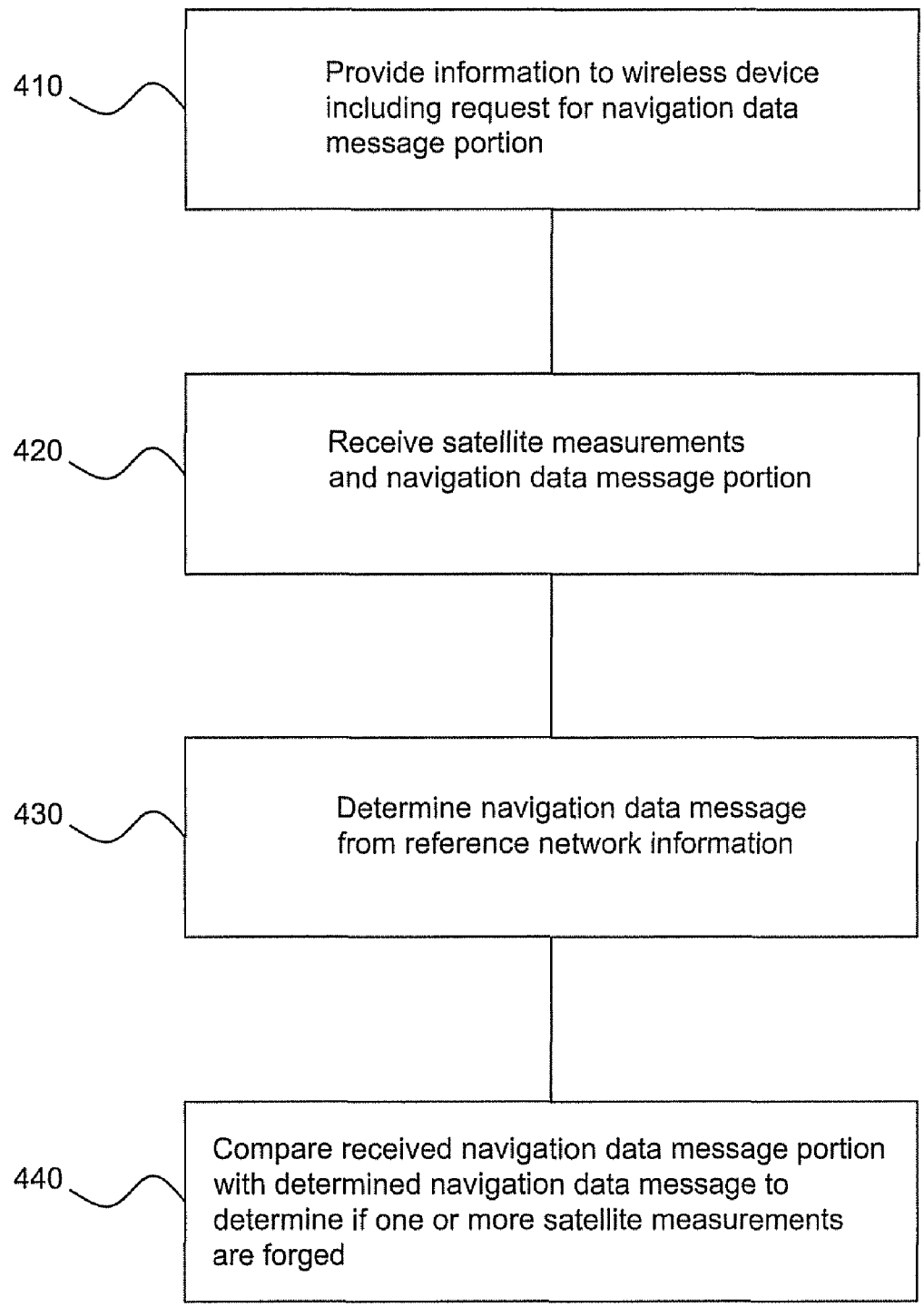
FIG. 4 is an algorithm according to one embodiment of the present subject matter.

FIG. 4 is an algorithm according to one embodiment of the present subject matter. With reference to FIG. 4, a method 400 is provided for detecting one or more forged satellite measurements transmitted from a wireless device. At step 410, information may be provided to a wireless device, the information including a request that the wireless device provide a portion of a navigation data message from one or more satellites to a location determining system. In one embodiment, the request from the location determining system to the wireless device further includes instructions that the wireless device provide the most recent bits of the received navigation data message and/or provide a time of measurement of the one or more satellite measurements. This time of measurement may, in one embodiment, be provided as an offset from a last change of a bit sequence in the received navigation data message.

One or more satellite measurements and the requested portion of the navigation data message may be received by the location determining system from the wireless device at step 420. At step 430, the navigation data message may be determined, predicted, assembled, observed, and/or reconstructed from the one or more satellites as a function of information from a reference network. An exemplary network may be, but is not limited to, a WARN, and reference network information may include ephemeris information, almanac information, ionosphere model information, UTC model information, and combinations thereof. This determined navigation data message may then be compared with the received navigation data message at step 440 to thereby determine whether any of the one or more satellite measurements provided by the wireless device have been forged. Of course, the location of the wireless device may then be estimated without the one or more forged satellite measurements.

Figure 5:
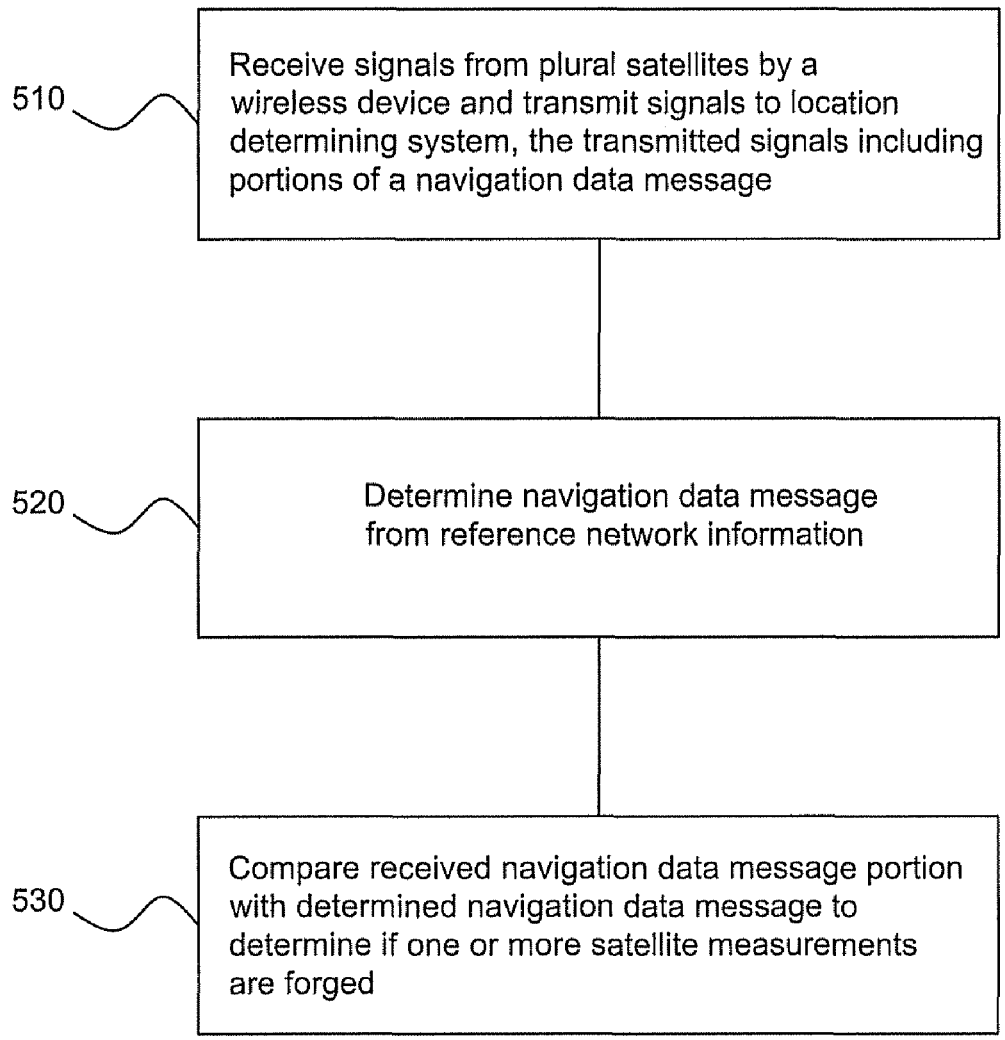
FIG. 5 is an algorithm according to another embodiment of the present subject matter.

FIG. 5 is an algorithm according to another embodiment of the present subject matter. With reference to FIG. 5, a method 500 for determining whether a wireless device transmitted a forged satellite measurement is provided. At step 510, signals from a plurality of satellites may be received by a wireless device and then transmitted to a location determining system. The transmitted signals represent measurements from the plurality of satellites and include one or more portions of a navigation data message. At step 520, a navigation data message may be determined from the plurality of satellites as a function of information from a reference network. At step 530, the determined navigation data message may then be compared with the received navigation data message portions provided by the wireless device to thereby determine whether one or more of the received satellite measurements from the device have been forged.

Figure 6:
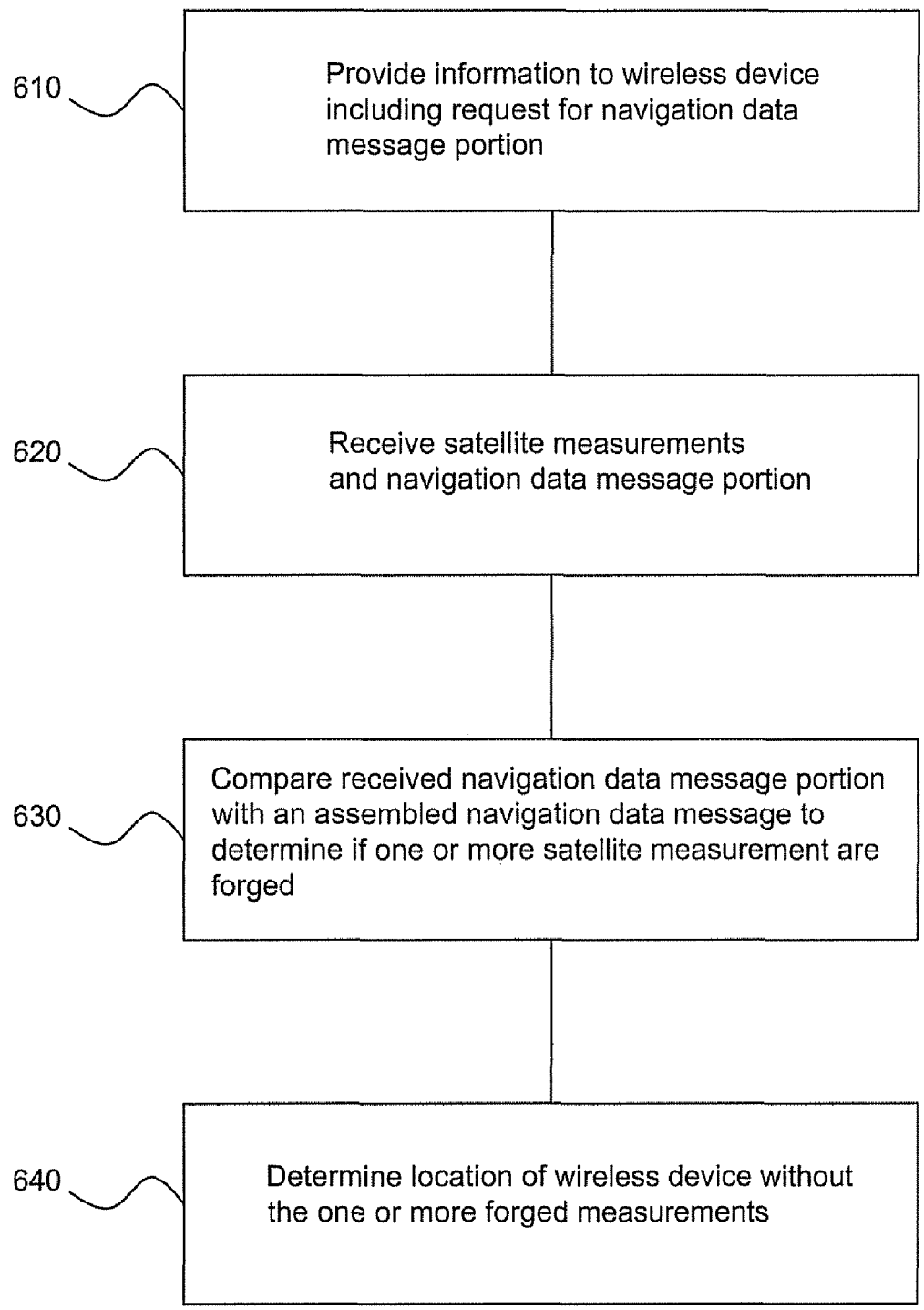
FIG. 6 is an algorithm according to a further embodiment of the present subject matter.

FIG. 6 is an algorithm according to a further embodiment of the present subject matter. With reference to FIG. 6, a method 600 for determining the estimated location of a wireless device when the device transmits one or more forged satellite measurements to a location determining system is provided. At step 610, a request may be sent to a wireless device instructing the device to provide a portion of a navigation data message from one or more satellites to a location determining system. In one embodiment, the request from the location determining system to the wireless device further includes instructions that the wireless device provide the most recent bits of the received navigation data message and/or provide a time of measurement of the one or more satellite measurements. This time of measurement may, in one embodiment, be provided as an offset from a last change of a bit sequence in the received navigation data message. In response to the request, the location determining system may receive, at step 620, one or more satellite measurements and the portion of the navigation data message from the wireless device. At step 630, the received navigation data message from the device may then be compared to an assembled navigation data message to thereby determine whether any of the one or more satellite measurements have been forged. The assembled navigation data message may be assembled, predicted, reconstructed and/or complied as a function of information from a reference network, such as, but not limited to, a WARN. At step 640, a location of the wireless device may be determined without the one or more forged satellite measurements. Of course, assistance data may also be provided to the wireless device as a function of the other satellite measurements to assist the device in determining a geographic location thereof.

Figure 7:
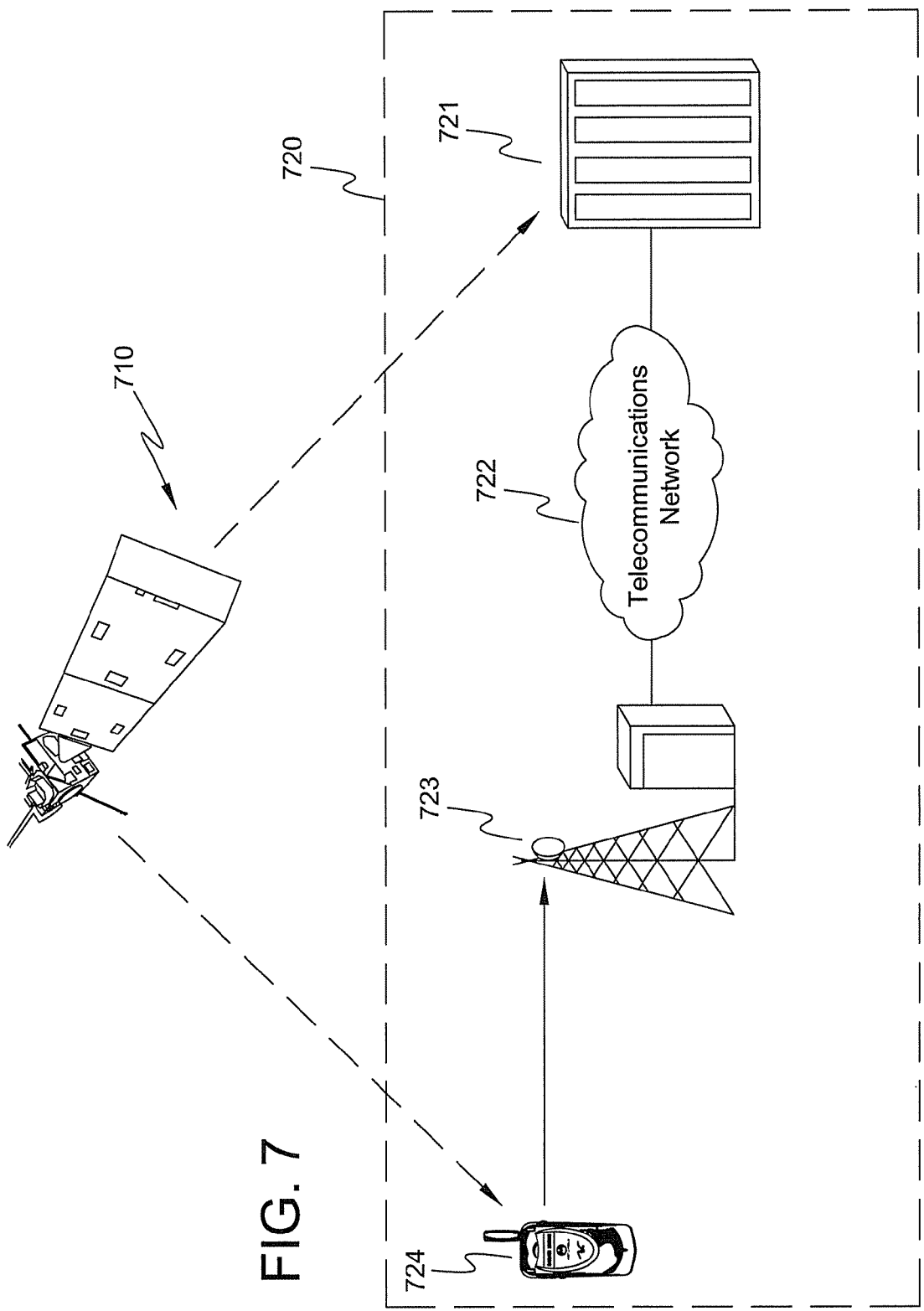
FIG. 7 is a schematic representation for implementing one embodiment of the present subject matter.

FIG. 7 is a schematic representation for implementing one embodiment of the present subject matter. With reference to FIG. 7, a satellite system 710 may communicate with a terrestrial system 720. An exemplary satellite system 710 may be a GNSS such as, but not limited to, a GPS, Galileo system, GLONASS system, QZSS, Compass system, Bediou system, etc. The ground system 720 may include a cellular network having a location center 721 and may receive information from or include a SBAS, WAAS, EGNOS, digital television network, and combinations thereof. The location center 721 may be an MLC, LIS or other network component such as a central office configured to communicate with a telecommunications network 722 and/or at least one base station 723. The location center 721 may include a receiver for receiving signals transmitted from a mobile device 724, and circuitry for determining the location of the mobile device 724 as a function of received signals from the device 724. The location center 721 may also include a database having information from a reference network such as a WARN. Exemplary information may be ephemeris information, almanac information, ionosphere model information, UTC model information, and combinations thereof. Exemplary reference networks may include a plurality of geographically dispersed reference stations and may include fixed reference stations, mobile reference stations, or combinations thereof. In a further embodiment, the location center 721 may include a transmitter for transmitting to the mobile device 724 acquisition assistance data, a location request, and other information and data. In one embodiment, the request may include information requiring the device 724 to provide a portion of a navigation data message from one or more satellites. The location center 721 may also include circuitry for determining, predicting, assembling, reconstructing and otherwise compiling a navigation data message from one or more satellites as a function of information from an exemplary reference network. Additionally, the location center 721 may include circuitry for comparing a determined navigation data message with a navigation data message or portion thereof received from a device 724 to thereby determine whether any of the one or more satellite measurements provided by the device 724 have been forged. Exemplary devices 724 may be, but are not limited to, a cellular device, text messaging device, computer, portable computer, vehicle locating device, vehicle security device, communication device, or wireless transceiver.

It is thus an aspect of embodiments of the present subject matter to increase the difficulty of spoofing a GNSS measurement. Although embodiments of the present subject matter may not prevent spoofing attacks, these embodiments may alert a wireless device user and/or an operator of a location determining system to such suspicious activity thereby decreasing the probability that a spoofing attack succeeds. Further embodiments of the present subject matter may be implemented easily and inexpensively by retrofitting existing GNSS receivers, GPS receivers and exemplary location determining systems.

As shown by the various configurations and embodiments illustrated in FIGS. 1-7, a method and system for protecting against spoofed A-GNSS measurement data have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method of detecting one or more forged satellite measurements transmitted from a wireless device, comprising the steps of:
    (a) transmitting information to a wireless device, the information including a request that the wireless device provide a portion of a navigation data message from one or more satellites to a location determining system;
    (b) receiving one or more satellite measurements and the portion of the navigation data message from the wireless device;
    (c) determining the navigation data message as a function of information from a reference network; and
    (d) comparing the determined navigation data message with the received navigation data message portion to thereby determine whether any of the one or more satellite measurements have been forged.

2. The method of claim 1 wherein the request further includes instructions that the wireless device provide the most recent bits of the received navigation data message.

3. The method of claim 1 wherein the request further includes instructions that the wireless device provide a time of measurement of one or more satellite measurements.

4. The method of claim 3 wherein the time of measurement is provided as an offset from a last change of a bit sequence in the received navigation data message.

5. The method of claim 1 wherein the step of determining further comprises predicting the navigation data message from the one or more satellites as a function of information from a reference network.

6. The method of claim 1 wherein the step of determining further comprises reconstructing the navigation data message from the one or more satellites as a function of information from a reference network.

7. The method of claim 1 wherein the reference network is a wide area reference network ("WARN").

8. The method of claim 1 wherein the reference network information includes at least one of ephemeris information, almanac information, ionosphere model information, UTC model information, and combinations thereof.

9. The method of claim 1 wherein the location determining system is a mobile location center ("MLC") or a location information server ("LIS").

10. The method of claim 1 wherein the satellites are part of a Global Navigation Satellite System ("GNSS").

11. The method of claim 10 wherein the GNSS is selected from the group consisting of: a Global Positioning System ("GPS"), Galileo system, GLONASS system, Quasi-Zenith Satellite System ("QZSS"), Compass satellite system, Bediou satellite system, and combinations thereof.

12. The method of claim 1 wherein the wireless device is selected from the group consisting of: cellular device, text messaging device, computer, portable computer, vehicle locating device, vehicle security device, communication device, and wireless transceiver.

13. The method of claim 1 further comprising the step of estimating a location of the wireless device without the one or more forged satellite measurements.

14. In a method for determining whether a wireless device transmitted a forged satellite measurement, the method comprising receiving at the wireless device signals from a plurality of satellites and transmitting to a location determining system signals representing measurements from the plurality of satellites, said measurements including one or more portions of a navigation data message, the improvement comprising determining a navigation data message as a function of information from a reference network, and comparing the determined navigation data message with the received navigation data message portions to thereby determine whether one or more of the received satellite measurements have been forged.

15. The method of claim 14 wherein the wireless device is selected from the group consisting of: cellular device, text messaging device, computer, portable computer, vehicle locating device, vehicle security device, communication device, and wireless transceiver.

16. The method of claim 14 wherein the satellites are part of a Global Navigation Satellite System ("GNSS").

17. The method of claim 16 wherein the GNSS is selected from the group consisting of: a Global Positioning System ("GPS"), Galileo system, GLONASS system, Quasi-Zenith Satellite System ("QZSS"), Compass satellite system, Bediou satellite system, and combinations thereof.

18. A system for detecting one or more forged satellite measurements transmitted from a wireless device, comprising:
(a) a transmitter for transmitting information to a wireless device, the information including a request that the wireless device provide a portion of a navigation data message from one or more satellites to the system;
(b) a receiver for receiving one or more satellite measurements and the portion of the navigation data message from the wireless device;
(c) circuitry for determining the navigation data message as a function of information from a reference network; and
(d) circuitry for comparing the determined navigation data message with the received navigation data message portion to thereby determine whether any of the one or more satellite measurements have been forged.

19. The system of claim 18 wherein the reference network is a wide area reference network ("WARN").

20. The system of claim 18 wherein the reference network information includes at least one of ephemeris information, almanac information, ionosphere model information, UTC model information, and combinations thereof.

21. The system of claim 18 wherein the satellites are part of a Global Navigation Satellite System ("GNSS").

22. The system of claim 21 wherein the GNSS is selected from the group consisting of: a Global Positioning System ("GPS"), Galileo system, GLONASS system, Quasi-Zenith Satellite System ("QZSS"), Compass satellite system, Bediou satellite system, and combinations thereof.

23. The system of claim 18 wherein the wireless device is selected from the group consisting of: cellular device, text messaging device, computer, portable computer, vehicle locating device, vehicle security device, communication device, and wireless transceiver.

24. A method for determining the estimated location of a wireless device when the device transmits one or more forged satellite measurements to a location determining system, comprising the steps of:
(a) sending a request to a wireless device to provide a portion of a navigation data message from one or more satellites to a location determining system;
(b) receiving one or more satellite measurements and the portion of the navigation data message from the wireless device;
(c) comparing the received navigation data message portion to an assembled navigation data message to thereby determine whether any of the one or more satellite measurements have been forged; and
(d) estimating a location of the wireless device without the one or more forged satellite measurements,
wherein the assembled navigation data message is assembled as a function of information from a reference network.

25. The method of claim 24 wherein the reference network is a wide area reference network ("WARN").

26. The method of claim 24 wherein the information includes at least one of ephemeris information, almanac information, ionosphere model information, UTC model information, and combinations thereof.

27. The method of claim 24 wherein the request further includes instructions that the wireless device provide the most recent bits of the navigation data message.

28. The method of claim 24 wherein the request further includes instructions that the wireless device provide a time of measurement of one or more satellite measurements.

29. The method of claim 28 wherein the time of measurement is provided as an offset from a last change of a bit sequence in the received navigation data message.

30. The method of claim 24 wherein the location determining system is a mobile location center ("MLC") or a location information server ("LIS").

31. The method of claim 24 wherein the satellites are part of a Global Navigation Satellite System ("GNSS").

32. The method of claim 31 wherein the GNSS is selected from the group consisting of: a Global Positioning System ("GPS"), Galileo system, GLONASS system, Quasi-Zenith Satellite System ("QZSS"), Compass satellite system, Bediou satellite system, and combinations thereof.

33. The method of claim 24 wherein the wireless device is selected from the group consisting of: cellular device, text messaging device, computer, portable computer, vehicle locating device, vehicle security device, communication device, and wireless transceiver.

* * * * *